United States Patent [19]

Kamiya et al.

[11] Patent Number: 5,387,461
[45] Date of Patent: Feb. 7, 1995

[54] SLIDING-BEARING MATERIAL

[75] Inventors: Soji Kamiya; Yuji Yokota, both of Aichi, Japan

[73] Assignee: Taiho Kogyo Co., Ltd., Toyota, Japan

[21] Appl. No.: 915,824

[22] PCT Filed: Nov. 28, 1991

[86] PCT No.: PCT/JP91/01636
§ 371 Date: Jul. 28, 1992
§ 102(e) Date: Jul. 28, 1992

[30] Foreign Application Priority Data

Nov. 29, 1990 [JP] Japan .................. 2-325325
Feb. 8, 1991 [JP] Japan ..................... 3-37819

[51] Int. Cl.6 .......................................... F16C 33/10
[52] U.S. Cl. ........................... 428/216; 384/625; 384/912; 384/913; 428/472; 428/653; 428/697
[58] Field of Search ............... 384/625, 912, 913; 428/653, 216, 472, 697

[56] References Cited

U.S. PATENT DOCUMENTS

| | | | |
|---|---|---|---|
| 4,252,866 | 6/1984 | Kamiya et al. | 428/653 |
| 4,296,183 | 10/1981 | Iwahana et al. | 428/653 |
| 4,375,499 | 3/1983 | Nara et al. | 428/653 |
| 4,806,308 | 2/1989 | Kamiya et al. | 420/530 |

FOREIGN PATENT DOCUMENTS

| | | |
|---|---|---|
| 2-66317 | of 0000 | Japan . |
| 56-83616 | 7/1981 | Japan . |
| 57-10176 | 2/1982 | Japan . |
| 60-33389 | 2/1985 | Japan . |
| 62-266223 | 11/1987 | Japan . |
| 62-283216 | 12/1987 | Japan . |

*Primary Examiner*—A. A. Turner
*Attorney, Agent, or Firm*—Armstrong, Westerman, Hattori, McLeland & Naughton

[57] ABSTRACT

To enhance the seizure resistance of sliding bearing material which has a layer (4) of aluminum-oxide (1) on the surface of the lining (5) consisting of aluminum-alloy bearing, the layer (4) consists of mixed phase of aluminum oxide (1) and tin oxide (2).

11 Claims, 1 Drawing Sheet

SLIDING-BEARING MATERIAL

TECHNICAL FIELD

The present invention relates to a sliding-bearing material used for an internal combustion engine. More particularly, the present invention relates to a sliding-bearing material with improved coating and layer, which are formed on the surface of an aluminum-alloy bearing for the purpose of enhancing the sliding characteristics.

BACKGROUND TECHNIQUE

Japanese Unexamined Patent Publication No. 2-66317 discloses a sliding bearing, in which an alumite layer with an uneven surface is formed on the surface of a lining consisting of aluminum alloy, a bonding layer having an uneven surface, which correlates with the uneven surface mentioned above, is formed on the lining layer, and a Pb overlay is formed on the bonding layer. It is described in this publication that, when the alumite layer is formed on the surface of lining material, the lining surface is slightly etched to form an uneven surface on the lining material simultaneously with the alumite formation in the alumite bath. It is further described that the thus formed unevenness is copied on the surface of the alumite layer to form relatively deep concavities. When the alumite bath is acidic, Sn, Pb and the like of the lining material are preferentially etched. When the alumite is alkaline, the aluminum matrix is preferentially etched.

In addition, the above mentioned bonding layer can be formed by wet plating by such methods as electroplating or the like, and dry plating by such methods as sputtering, ion-plating or the like. Materials used for the bonding layer are Ni, Cu, Fe or the like alone or in the alloy. Plural plating layers of Ni plating, Cu plating or the like can be used after applying the Zn plating layer.

In the above described sliding bearing, the overlay layer attains, at the initial period of use enhancement of initial compatibility, mitigation of local contact, and reduction in coefficient of friction. Also, local wear of the overlay layer due to peeling or the like is prevented because its bonding strength is increased. In addition, if the bonding layer and the overlay layer are worn out locally to expose the convex surface of the alumite layer, good seizure-resistance and wear-resistance can be maintained.

Japanese Examined Patent Publication No. 57-10176 discloses a sliding bearing, whose bearing material consists of an alloy with a composition of from 3 to 10% of Sn, from 4.5 to 11.7% of Si, from 0.25 to 1.5% of Cu, from 0.1 to 1.5% of Ni (the total amount of Cu and Ni being from 0.5 to 2.0%), Al in balance, and, a 5 to 30 $\mu$m thick anodic oxidation coating formed to enhance the compatibility and durability. The anodic oxidation in this publication is carried out by using a 10–14 wt. % sulfuric acid aqueous solution at bath temperature of from 20° to 25° C., using the bearing material as an anode and a lead plate as a cathode, and conducting direct current at a current density of 2A/dm$^2$ for 10 to 30 minutes. The anodic oxidation coating replaces the conventional Pb-Sn based overlay which is deposited on the aluminum alloy with or without a replacement plating layer. The anodic oxidation coating allegedly improves the adherence.

Since the engines of automobiles are recently operated at high speed and under high pressure, the initial characteristics, such as roughness and waviness of a shaft have greatly influenced the performance and life of a bearing. Kelmet with an overlay exhibits good compatibility but its bearing material, i.e., kelmet, lacks in the sliding properties, such as wear resistance or the like. Therefore, when the initial properties of the bearing are poor, a problem in premature wear arises, which leads to abnormal wear and seizure.

On the other hand, the load resistance and fatigue resistance of aluminum-bearing alloys have been improved by enhancing the strength and hence hardness. Along with this, the compatibility of aluminum bearing alloys tend to become poor. Furthermore, since cast shafts with dispersed hard matters have been used frequently for engine shafts, the aluminum bearing alloys are worn out and roughened. This causes abnormal wear. A problem of seizure of bearings also arises.

In the light of the above circumstances, the prior art is considered.

Japanese Unexamined Patent Publication No. 2-66317 mentions a high-strength and high-hardness aluminum-bearing alloy but does not disclose a measure effective for preventing its seizure. That is, although the alumite layer present on the entire surface of the lining material exhibits improved adherence, it does not exhibit, on the other hand, good sliding characteristics, so that seizure is likely to occur when the overlay is almost totally worn out. Specifically, the seizure is likely to occur during initial or middle period of use when the alumite layer is present on the entire surface of the lining layer.

Japanese Examined Patent Publication No. 57-10176 discloses an aluminum bearing alloy of high-strength and high-hardness type. It has turned out that, since the alumite coating is formed by anodic oxidation by the use of sulfuric acid solution, the tin phase of the aluminum alloy dissolves by the anodic oxidation treating liquid. As a result of the disappearance of the tin phase, wear of the alumite coating advances so that a shaft slides on the mixed phase of alumite and lining. When this sliding occurs, the seizure becomes extremely liable to occur.

DISCLOSURE INVENTION

The present invention solves the problems involved in the above described prior art and provides a sliding bearing material which comprises a lining consisting of aluminum-alloy bearing, and a first coating formed on the surface of the lining, comprising a mixed phase of aluminum oxide and tin oxide, and having a thickness of from 0.1 to 5 $\mu$m.

The constitution of the present invention is hereinafter described.

Aluminum oxide has excellent qualities in that it does not adhere with the opposed shaft, and adjusts projections and roughness of the opposed shaft because of high hardness of the aluminum oxide. Thus, aluminum oxide promotes sliding under fluid-lubricating conditions. In addition, since the underlying lining is soft relative to the aluminum oxide, and, further the aluminum oxide layer is thin, the surface of the sliding bearing deforms in conformity with the waviness of a shaft. Meanwhile, the sliding properties of the tin oxide are equivalent to those of a solid lubricant and hence compensate for the sliding properties of the aluminum oxide.

When the thickness of the coating consisting of aluminum oxide and tin oxide is less than 0.1 $\mu$m, the properties of the respective oxides are not fully demonstrated. On the other hand, when such thickness exceeds 5 μm, the aluminum oxide modifies the lining in such a manner that the compatibility of the lining is impaired.

When the proportion of the aluminum oxide and tin oxide is such that the former and latter consist of 95-75 area % and 5-25 area %, respectively, the properties of both oxides are well balanced. That is, both the functions of adjusting the shaft to the bearing surface and of providing sliding characteristics are attained at a high level.

In addition, there is provided according to the present invention a sliding bearing material, which further comprises on the above mentioned first coating a second 1 to 20 μm thick coating which consists of one material selected from Pb-based overlay, pure Sn overlay, Sn-based overlay and resin containing solid lubricant. That is, a known alloy-overlay, polyimide-based resin containing such solid lubricant as $MoS_2$, $WS_2$, BN, graphite or the like, or binder resin such as phenol resin, is formed in the above mentioned sliding bearing, so as to make the waviness of a shaft, connecting rod or the like by means of wearing down of sliding bearing for itself, and hence to improving the initial compatibility. When the thickness of the overlay or the like is less than 1μm, its effects are so small to provide satisfactory initial compatibility. On the other hand, when such thickness exceeds 20 μm, the properties of the overlay or the like are not at all improved, but only the cost increases. Thickness of this coating is preferably from 2 to 8 μm.

Furthermore, there is provided a sliding material, in which a zinc replacement plating layer is formed on the coating consisting of the aluminum oxide—tin oxide mixed phase and, further the above-mentioned overlay layer is formed on the zinc layer, so as to enhance the adherence between the overlay layer and the coating consisting of the aluminum oxide—tin oxide mixed phase. Zn, Ni and Cu alone or as an alloy may be plated after depositing the zinc replacement layer or without such deposition.

The aluminum bearing alloy used as the lining in the present invention contains Sn as an essential element and Si, Cr, Mn, Zr, Cu, Zn, Pb, In or the like as an optional element(s). The Sn content is preferably from 3 to 25%. When the Sn content is less than 3%, the sliding property and wear resistance are poor. On the other hand, when the Sn content exceeds 25%, the amount of the tin phase is unsatisfactory.

Next, a method for producing the sliding bearing according to the present invention is described.

First, an ingot of aluminum alloy is produced by casting. This is subjected to repeated rolling and annealing to provide a thin sheet and structure as homogeneous as possible. Instead of casting, extrusion or sintering may be carried out. Instead of rolling, extrusion may be carried out. The lining material provided by rolling is pressure-bonded with a steel-sheet backing. Annealing is carried out to induce diffusion between both materials and hence to enhance the bonding strength. The thus obtained bimetal is shaped into the form of semicircular shape cut into halves. Its inner surface is machined to provide the bearing shape. Instead of machining the inner surface described above, boring or the like can be used to form streaks from 2 to 6 μm in depth and from approximately 100 to 600 μm in pitch.

When the bearing blank produced as described above is anodically oxidized, the tin phase, which is present on the surface of the bearing blank as a minority phase, as well as the aluminum-alloy matrix, are oxidized, so that a coating consisting of tin-oxide and aluminum-oxide mixed phase is obtained. When the tin is oxidized, the thickness of tin oxide is virtually the same as that of aluminum oxide. Therefore, when the tin layer is thick, its upper portion is oxidized, while the lower portion remains in a metallic state. The anodic oxidation treatment is preferably carried out by using alkaline treating liquid. Since the tin phase dissolves in acidic treating liquid, the desired mixed phase is not obtained. As to the alkaline liquid, the sodium phosphate treating liquid is preferred. Instead of anodic oxidation, it is possible to carry out heating at a temperature of from 200° to 300° C. in the moisture-laiden air. Also by this heat treatment, the tin layer is oxidized to the tin oxide, and oxygen passes through the natural oxide film on the surface of the aluminum alloy and oxidizes the aluminum. The coating consisting of tin-oxide and aluminum-oxide mixed phase is therefore obtained.

BRIEF DESCRIPTION OF THE DRAWINGS

FIGS. 1 and 2 show schematic drawings of the coating. As is shown in these drawings, the structural condition of the aluminum alloy, i.e., the mother material, is reflected in the structure of the coating 4. That is, in the thus formed coating 4, the tin oxide 2 is dispersed in the matrix consisting of aluminum oxide 1. Since the tin oxide 2 is brought into contact with the aluminum oxide 1, i.e., the matrix, the boundary of one of them is the boundary of the other. An opposed shaft is therefore necessarily brought into contact with both 2, 4 under the boundary lubricating condition. The sliding characteristics of the bearing are therefore improved. Incidentally, Si 3 is not oxidized by the anodic oxidation and is exposed on the surface as metal particles.

Figure 1:
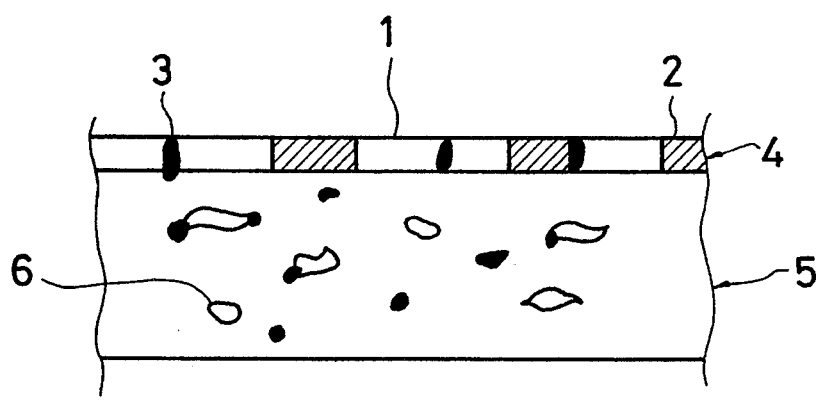
FIG. 1 is a schematic cross sectional drawing of a sliding bearing according to the present invention.
Figure 2:
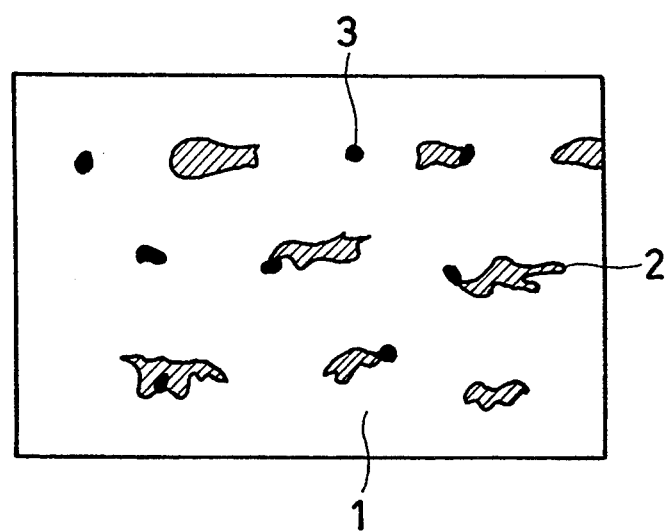
FIG. 2 is a cross sectional drawing of FIG. 1.

Beneath the coating is present either the aluminum alloy 5, in which the Si 3 and tin phase 6 are dispersed, or the zinc displacement plating layer.

The above described structure of the respective layers may be provided on a sliding bearing used for a crank shaft of an engine, whose aluminum lining has been subjected to streak forming. In this case, when the wear progresses to some degree, various layers, such as aluminum alloy layer—aluminum oxide and tin oxide layers, aluminum alloy layer—aluminum oxide and tin oxide layers—pure Sn or Sn overlay layer, or aluminum alloy layer—aluminum oxide and tin oxide layers—Zn, Ni or Cu layer—pure Sn or Sn overlay layer, are exposed on the sliding surface in mixed manner. The sliding characteristics are thus furthermore enhanced.

The present invention is described by way of examples.

BEST MODE FOR CARRYING OUT THE INVENTION

Example 1

An aluminum alloy, which has a composition of Al—12Sn—1.5Pb—3Si—1Cu—0.2Cr is subjected to a process of casting—repeated rolling and annealing—pressure bonding—annealing—forming—machining of the inner side (bearing shape) so as to provide a bearing blank. The following treatments were applied to this bearing blank.
  (1) Degreasing: Vapor cleaning with trichloroethylene or the like.
  (2) Formation of Anodic oxidation Layer: 100 g/l of sodium phosphate, 30° C., 12V, 3.5A/cm$^2$, 15 minutes. An approximately 1.2 μm anodic oxide layer was formed.
  (3) Rinse with hot water at 80°–100° C.
  (4) Zn replacing treating as deemed necessary. The main components are ZnO and NaOH. Dipping 50 seconds.
  (5) Formation of overlay. If the overlay is formed, the plating is carried out by plating liquid, whose main component is Sn(Pb), at 25° C. and 2A/dm$^2$ for 10 minutes. A 4 μm thick overlay is formed.

Comparative Example

An alloy having composition of Al—12Sn—1.5-Pb—3Si—1Cu—0.2Cr was worked and treated as in Example 1 so as to produce a bearing blank. Subsequently, the following treatments were applied to this bearing blank.
  (1) Degreasing
  (2) Anodic oxidation: 3% oxalic acid solution, 35° C., 18V, 15A/dm$^2$, 30 minutes. Approximately 0.5 μm anodic oxidation was formed.
  (3) Zn replacing treatment ZnO, NaOH; dipping for 50 seconds
  (4) Plating with 100 g/l of plating solution. The main components are Sn(Pb) organic carboxylic acid 2A/dm$^2$, 25° C., 10 minutes, 5 μm.

The samples as treated above were tested for the performances by the following method.

Tester
Journal type bearing tester
Diameter of shaft: 40 mm
Width of bearing: 17 mm
Oil clearance: 55 μm
Condition of Seizure Test
Rotation number: 5,000 rpm
Surface pressure: 120 kg/cm$^2$
Temperature of oil fed: 140° C.

Feeding of oil was stopped, and the time until seizure was measured. The test results are shown in the following table.

presence or absence of a zinc replacement plating layer, and, then the inventive and comparative examples are compared with each other, it is recognized that the seizure resistance is enhanced by applying the anodic oxidation according to the present invention. The sliding bearing according to the present invention is therefore appropriate for use in sliding at a high speed and high surface-pressure.

We claim:

1. A sliding bearing material, which comprises a lining consisting of aluminum bearing-alloy containing 3–25% of Sn, and a first coating formed on the surface of the lining, having a thickness of from 0.1 to 5 μm, and consisting essentially of a mixed phase of aluminum oxide and tin oxide which oxides are present from the top surface to bottom surface of said first coating, wherein said first coating consists of 95 to 75% by area of aluminum oxide and from 5 to 25% by, area of tin oxide.

2. A sliding bearing material according to claim 1, further comprising, on said coating, a 1 to 20 μm thick second coating comprising a material selected from the group consisting of Pb, Sn, and resin containing solid lubricant.

3. A sliding bearing material according to claim 1, further comprising a plating layer formed on said first coating and consisting of at least one of zn, Ni or cu, and a 1 to 20 μm thick second coating comprising a material selected from the group consisting of Pb, Sn and resin containing solid lubricant.

4. A sliding bearing material according to claim 1, 2 or 3, wherein the first coating has a thickness of from 0.1 to 3.5 μm.

5. A sliding bearing material according to claim 1, 2 or 3, wherein the surface of said lining has streaks formed by boring.

6. A sliding bearing material according to claim 5, wherein the streaks are from 2–6 μm in depth and 100–600 μm in pitch.

7. A sliding bearing material a lining consisting of aluminum bearing-alloy containing 3–25% Sn, and a first coating formed on the surface of the lining, having a thickness of from 0.1 to 5 μm, comprising a mixed phase of aluminum according to claim 11, wherein the first coating is formed by anodically oxidizing the surface by alkaline solution.

TABLE 1

| No. | Thickness of Intermediate Layer (μm) | Thickness of Zn Replacement Layer (μm) | Overlay Composition | Thickness of Overlay (μm) | Seizure Resistance |
|---|---|---|---|---|---|
| 1 | 0.1 | — | — | — | 65 |
| 2 | 0.8 | — | — | — | 70 |
| 3 | 1.5 | — | — | — | 80 |
| 4 | 3 | — | — | — | 75 |
| 5 | 5 | — | — | — | 60 |
| 6* | 0.8 | — | — | — | 35 |
| 7* | 5 | — | — | — | 20 |
| 8 | 0.1 | — | Sn | 2 | 120 |
| 9 | 0.5 | 0.05 | Pb-5Sn-10In | 5 | 155 |
| 10 | 1 | 0.05 | Sn-0.5In | 1 | 125 |
| 11 | 1.8 | — | Pb-12Sn-2Cu | 20 | 180 |
| 12 | 3.5 | — | MOS$_2$90,PAI10 | 8 | 120 |
| 13 | 5 | 0.05 | Pb-10In | 15 | 160 |
| 14* | 3 | 0.05 | Pb-5Sn-10In | 5 | 75 |
| 15 | 3 | 0.05 | Pb-5Sn-10In | 5 | 95 |

Remarks: * marks are comparative
Intermediate layer: Ni(No.14); alumite (Nos.1–13, 15)

Industrial Applicability

When the structure of the layers shown in Table 1 are distinguished it by the presence or absence of overlay, 8. A sliding bearing material according to claim 7, wherein said alkaline solution is sodium phosphate solution.

9. A sliding bearing material according to claim 1, 2 or 3, wherein said lining contains tin, and said first coating is formed by oxidizing the surface of the lining at 200°–300° C. in an air containing moisture.

10. A sliding bearing material according to claim 2, comprising a zinc replacement plating layer between the first coating and the second coating.

11. A sliding bearing material according to claim 3, comprising a zinc replacement plating layer between said second coating and the plating.

* * * * *